No. 727,807. PATENTED MAY 12, 1903.
A. KING.
APPARATUS FOR REMOVING PLANTS FROM STREAMS.
APPLICATION FILED AUG. 29, 1902.
NO MODEL. 3 SHEETS—SHEET 1.
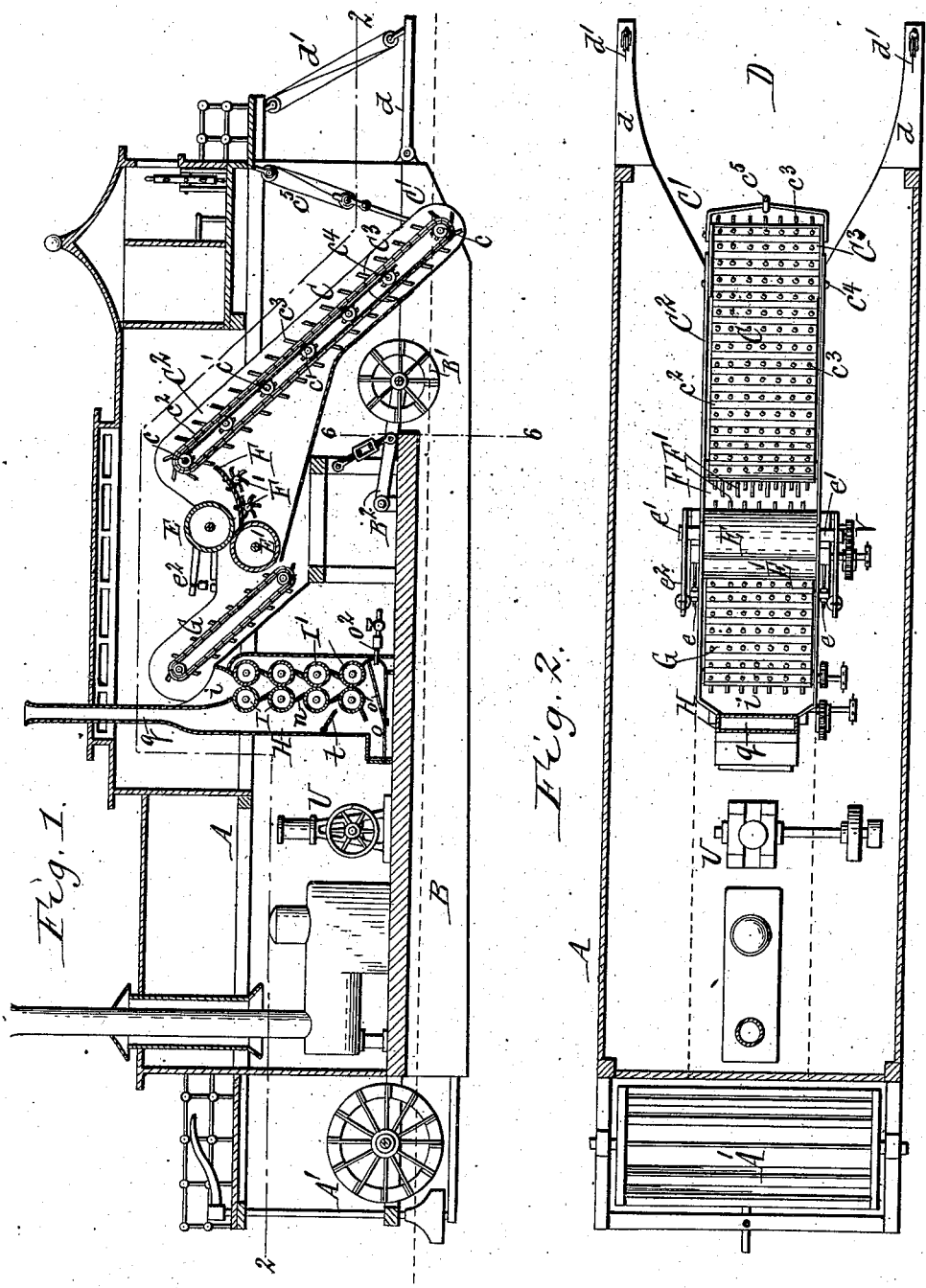
Witnesses:
Robert Wertknecht
Emma M. Graham
Arthur King, Inventor
By Giger & Popp
Attorneys No. 727,807. PATENTED MAY 12, 1903.
A. KING.
APPARATUS FOR REMOVING PLANTS FROM STREAMS.
APPLICATION FILED AUG. 29, 1902.
NO MODEL. 3 SHEETS—SHEET 2.
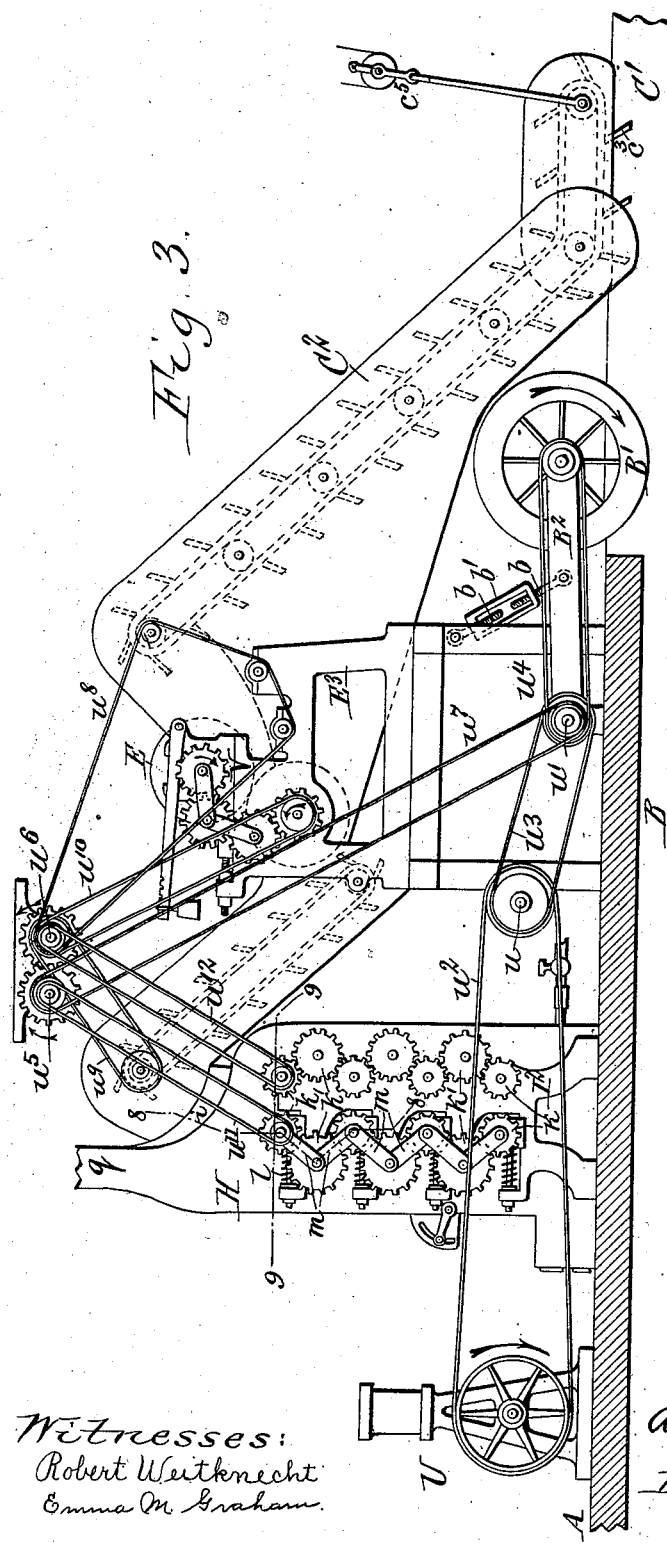
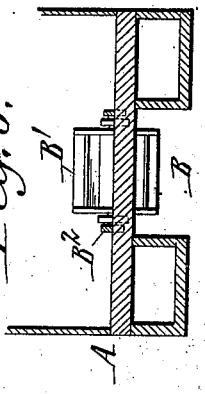
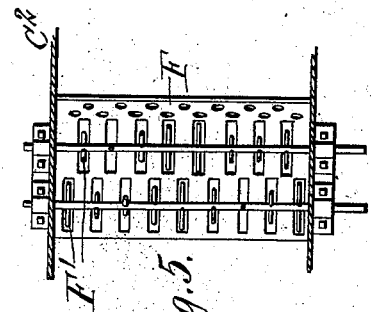
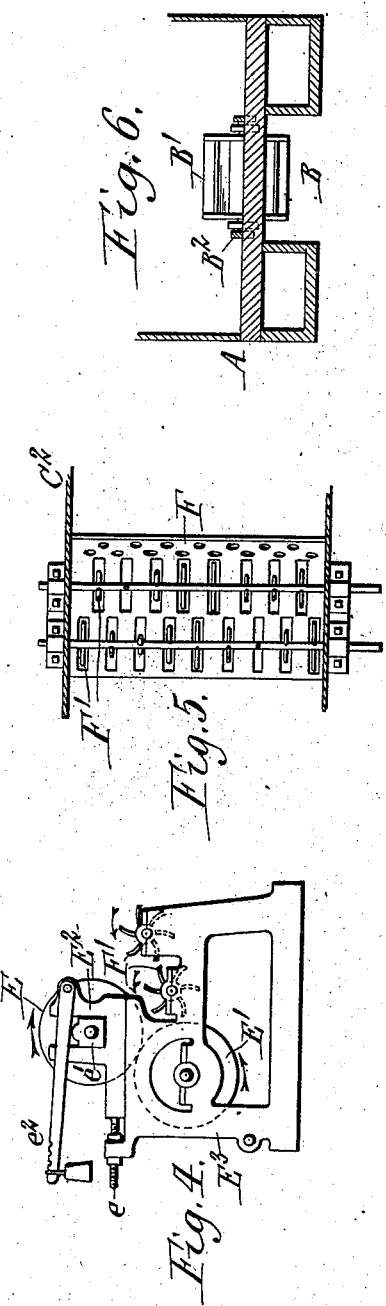

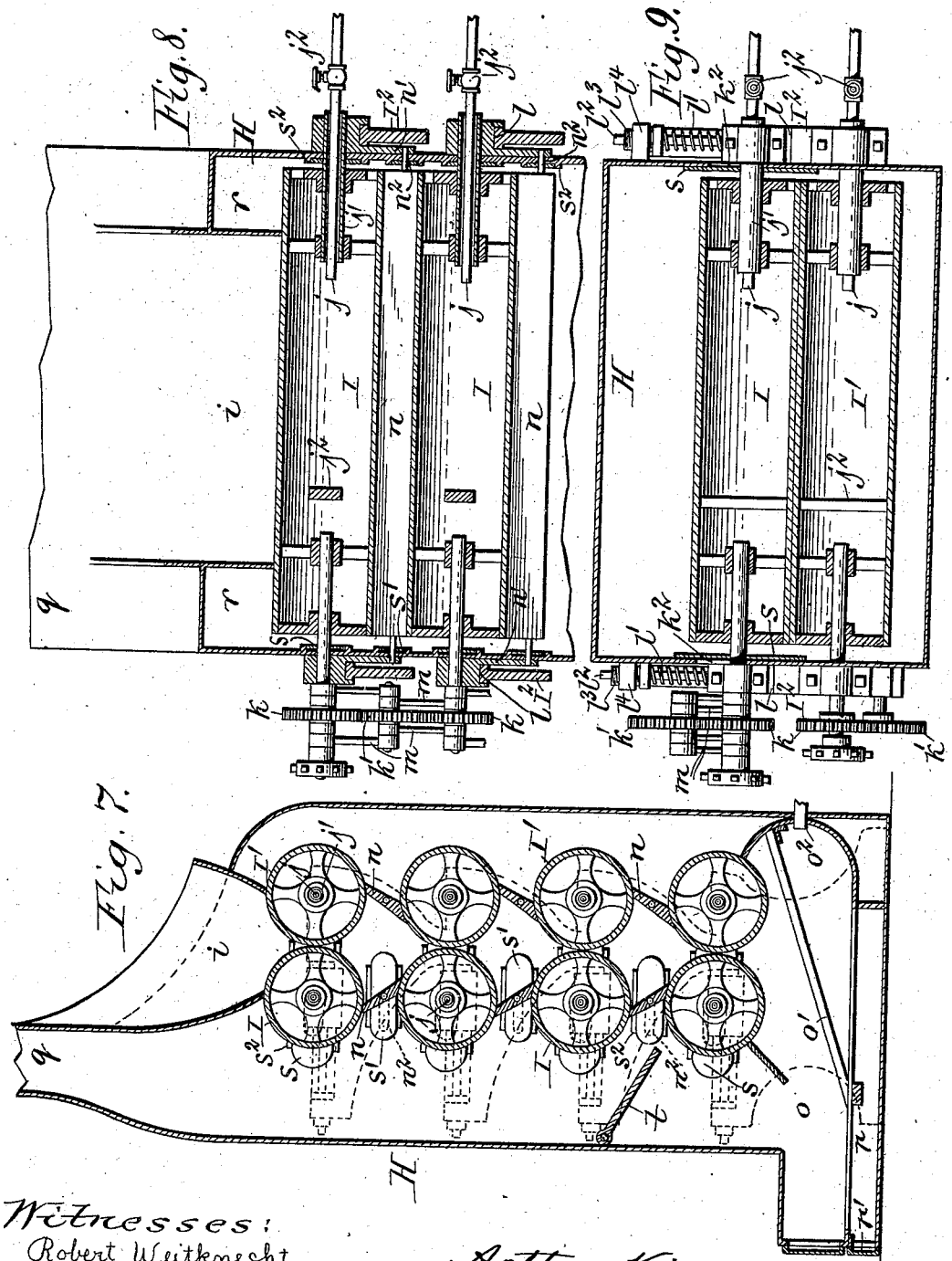

No. 727,807. Patented May 12, 1903.

UNITED STATES PATENT OFFICE.

ARTHUR KING, OF BUFFALO, NEW YORK, ASSIGNOR TO ADDIE KING, OF BUFFALO, NEW YORK.

APPARATUS FOR REMOVING PLANTS FROM STREAMS.

SPECIFICATION forming part of Letters Patent No. 727,807, dated May 12, 1903.

Application filed August 29, 1902. Serial No. 121,487. (No model.)

*To all whom it may concern:*

Be it known that I, ARTHUR KING, a citizen of the United States, residing at Buffalo, in the county of Erie and State of New York, have invented new and useful Improvements in Apparatus for Removing Plants from Streams, of which the following is a specification.

In the streams of the tropics, notably those of Florida and Alabama, hyacinths and similar floating plants grow in such abundance as to impede navigation at times.

The object of my invention is to provide an efficient apparatus by which such plants and similar obstructions may be expeditiously removed and destroyed at small expense.

In the accompanying drawings, consisting of three sheets, Figure 1 is a vertical longitudinal section of the apparatus. Fig. 2 is a horizontal section in line 2 2, Fig. 1. Fig. 3 is a fragmentary sectional elevation of the apparatus, on an enlarged scale, showing the current-wheel and the lower section of the elevator raised to their inoperative position. Fig. 4 is a detached sectional side elevation of the pressure-rollers and adjacent parts. Fig. 5 is a fragmentary horizontal section of the feeders which deliver the elevated plants to the pressure-rollers. Fig. 6 is a transverse section of the hull of the apparatus in line 6 6, Fig. 1. Fig. 7 is an enlarged vertical section of the drier. Fig. 8 is a fragmentary vertical section in line 8 8, Fig. 3, on an enlarged scale. Fig. 9 is a horizontal section in line 9 9, Fig. 3, on an enlarged scale.

Similar letters of reference indicate corresponding parts throughout the several views.

The various parts of my improved apparatus are mounted on a suitable scow or boat A, preferably having its own means of propulsion, such as a paddle-wheel A'. The hull of the boat is provided centrally in its bottom with a longitudinal water-channel B, extending from bow to stern and adapted to receive the floating plants at its front end. If desired, a suitable current-wheel B' may be arranged in this channel for producing a rearward current through the same and causing the plants to be drawn into it. In the construction shown in the drawings the current-wheel is journaled on the free end of a vertically-swinging supporting-frame $B^2$ to permit the wheel to be raised out of the water when not in use. This supporting-frame is elevated by means of screw-threaded suspension-rods $b$, connected by a turnbuckle $b'$.

C indicates an elevator or conveyer arranged in the boat in front of the current-wheel B' and having its lower portion normally submerged in the channel B, so as to intercept the plants entering the front end of the channel and elevate the same into the scow through an opening C' in its deck. The elevator preferably consists of endless inclined belts or sprocket-chains running around upper and lower sets of sprocket-wheels $c$ and intermediate supporting-wheels $c'$ and carrying transverse slats $c^2$, which are provided with one or more rows of elevating-pins $c^3$. These slats are separated sufficiently to allow the water from the plants to drain between them. The elevator is arranged in a chute or casing $C^2$, which is composed of side walls and an inclined bottom and which serves to return the drained water into the stream through the opening C'. The lower portion or section $C^3$ of the elevator is preferably hinged to the stationary upper section, as shown at $c^4$, to permit the same to be raised clear of the stream when the apparatus is not in use, as seen in Fig. 3. For this purpose a suitable hoisting-tackle $c^5$ is connected with the free end of the hinged elevator-section.

As shown in Fig. 2, the hull of the scow is provided in its bow with a comparatively wide recess or throat D, which gradually narrows toward the front end of the channel B and serves to gather the plants and direct them toward the elevator C. The front portions of the walls of this gathering-throat preferably consist of platforms $d$, which extend forwardly beyond the body of the hull. These platforms may be hinged to swing vertically, as shown, to permit their being turned up out of the way, if desired. A suitable hoisting-tackle $d'$ is connected with the platforms for supporting and elevating them.

E E' indicate a pair of squeezing or pressure rollers arranged behind the head of the elevator C and adapted to receive the elevated plants therefrom and squeeze the remaining water out of the same. These rollers are supported in frames $E^2$ $E^3$, and the upper one is preferably capable of forward and backward movement, so that it may be adjusted to overhang the lower roller more or less, as shown in Figs. 1 and 4, for better guiding the plants between the rollers. For this purpose the frame $E^2$ of the upper roller is slidably mounted on the lower frame $E^3$ and provided with rotary horizontal shifting screws $e$ or any other suitable adjusting means. The upper roller is preferably mounted in yielding bearings $e'$ to permit the rollers to adapt themselves to different-sized plants. In the construction shown in the drawings, Fig. 4, the bearings of the upper roller slide vertically in ways of the frame $E^2$ and are constantly depressed by weighted levers $e^2$, pivoted to said frame.

The elevated plants are delivered from the head of the elevator C to the squeezing-rollers E E' by an inclined board or chute F, which may be perforated, as shown, for allowing the water from the plants to drain through it into the main drain-chute $C^2$. One or more rotary feeders or wheels F' are preferably arranged between the elevator and the squeezing-rollers for facilitating the delivery of the plants to the latter. These feeders may consist of horizontal shafts journaled in the frame $E^3$ and having radial fingers which pass through slots in the feed-board F. As shown in Fig. 1, the bottom of the drain-chute $C^2$ extends rearwardly under the squeezing-rollers, so as to catch the water pressed out of the plants by the same.

G indicates a second elevator or conveyer arranged to receive the plants from the squeezing-rollers E E' and deliver the same to a suitable drier by which the moisture remaining in the plants is evaporated, so as to thoroughly dry them and facilitate their subsequent destruction in a suitable furnace. This secondary elevator may be similar in construction to the primary elevator C.

The drier preferably consists of an upright casing H, containing several pairs of horizontal drying-rollers I I', arranged one above another and adapted to successively receive the plants. The journals of these rollers pass through the side walls of the casing H and are journaled in bearings carried by upright side frames $I^2$, arranged on the outer side of the casing. The casing is provided in its top above the uppermost pair of drying-rollers with a feed-hopper $i$, which receives the plants from the head of the secondary elevator G. The drying-rollers are hollow and heated internally by any suitable heating agent, so that the plants are dried by contact with the rollers in passing between the same. I prefer to employ a suitable gas as fuel for heating the rollers, and for this purpose each roller is provided with an internal burner pipe or nozzle $j$, entering the same through a hollow journal $j'$ of the roller and provided outside of the roller with a valve $j^2$. The hollow journal $j'$ may be sufficiently larger than the burner-pipe to admit air to the burner, as shown in Fig. 8. Flame-spreading bars are preferably arranged transversely in the drying-rollers in front of the burners $j$.

Any suitable driving mechanism may be employed for rotating the several pairs of drying-rollers in the proper direction to feed the plants downwardly through the series. In the preferred construction shown in the drawings the rollers of each vertical series are driven from the uppermost roller of the row by gear-wheels $k$ and intermediate idler-gears $k'$. One drying-roller of each pair is preferably mounted in yielding bearings to allow the rollers to accommodate themselves to plants of varying thicknesses and prevent breakage or undue straining of the parts. Accordingly the journals of the movable rollers pass through horizontal slots $k^2$ in the sides of the casing H, and their bearings are arranged to slide on horizontal guides $l$ of the supporting-frames $I^2$ and are backed by springs $l'$. These springs surround horizontal rods $l^2$, which extend outwardly from the yielding roller-bearings and slide in externally-screw-threaded sleeves $l^3$, arranged in lugs $l^4$ of the frames $I^2$. These sleeves form adjustable abutments for the springs $l'$, by which the tension of the latter may be regulated in an obvious manner. In order to allow the idler-gears $k'$ to yield with the movable drying-rollers and at the same time remain in constant mesh with the gear-wheels $k$ of the rollers, each of these idler-gears is carried by toggle-like links $m$, which are pivoted at their adjoining ends to the journal of of the corresponding idler-gear and at their opposite ends to the journals of the yielding rollers immediately above and below said gear, as shown in Figs. 3 and 8. By this construction the several movable rollers are free to yield independently of one another, and yet all of the rollers of the yielding series are driven without interruption.

$n$ indicates horizontal scrapers arranged to bear against the periphery of the drying-rollers for detaching any adhering plants therefrom. These scrapers are preferably arranged in two opposing vertical series, as shown in Fig. 7, and each scraper bears at its upper edge against the under side of the roller above it and at its lower edge against the roller below it. The opposing scrapers of each pair converge downwardly, so as to form together a hopper for directing the descending plants between the meeting sides of the rollers next below. As shown in Fig. 8, the scrapers are supported by arms or hangers $n'$, depending from the bearings of the drying-rollers, the scrapers being provided at their ends with horizontal pins which pass through horizontal slots $n^2$ in the side walls of the casing H and enter openings in said hangers. The scrapers are kept in their operative position by making their lower portions heavier than their upper portions, as shown, or by any other suitable means. As the scrapers are carried by the bearings of the drying-rollers, those of the yielding rollers take part in the movements of the latter and always remain in contact therewith.

The drier is preferably combined with a suitable furnace for burning the dried plants. In the construction shown in the drawings the casing H is closed on all sides to form a heating-chamber and provided below the series of drying-rollers with a combustion-chamber $o$, containing a grate $o'$, which receives the plants from the lowermost pair of said rollers, and a gas-fuel burner $o^2$, located below the grate. Under the combustion-chamber is an ash-pit $p$, having a door $p'$ for the removal of the ashes. By this construction the heat from the combustion-chamber rises through the casing H and assists in heating the drying-rollers and drying the plants. The products of combustion escape through a stack $q$, rising from the top of the casing.

As shown in Fig. 8, the feed-hopper $i$ of the drier does not extend throughout the width of the casing, but its side walls are arranged at a distance from the sides of the casing and extend downwardly in close proximity to the surface of the uppermost drying-rollers. By this construction flues $r$ for the escape of the products of combustion are formed on opposite sides of said feed-hopper.

In order to prevent the escape of the heat from the casing through its slots $k^2$ and $n^2$, so far as practicable these slots are closed by sliding shields $s\ s'$, carried by the adjacent roller-journals and the scrapers $n$ and bearing against the inner sides of the drier-walls, as shown in Figs. 8 and 9. As illustrated in these views, the shields slide between suitable guides $s^2$, arranged on the walls of the casing.

A suitable damper $t$, Figs. 1 and 7, may be arranged in the passage between the front wall of the casing and the drying-rollers, if desired.

The various movable members of the apparatus may be driven from an engine U or other prime motor by any suitable means. In the construction shown motion is transmitted from the engine-shaft to two lower counter-shafts $u\ u'$ by belts $u^2\ u^3$, and the current-wheel B' is driven from the front counter-shaft by a belt $u^4$. Above the secondary elevator G are two upper counter-shafts $u^5\ u^6$, which are geared together, as shown, and one of which is driven from the lower counter-shaft $u'$ by a belt $u^7$. From these upper counter-shafts the primary and secondary elevators C and G, the feed-wheels F', the lower squeezing-roller E', and the uppermost drying-rollers I I' are driven by belts $u^8$, $u^9$, $u^{10}$, $u^{11}$, and $u^{12}$. The upper squeezing-roller is driven from its companion roller preferably by gearing V, of the same construction as that of the yielding drying-rollers I.

The operation of the apparatus is as follows: The recessed bow of the boat is brought up to the edge of a mass of the floating plants to be removed and the apparatus is set in motion. The backward current produced by the current-wheel B' draws the plants into the gathering-throat D and the channel B within reach of the primary elevator C, which latter picks up the plants and discharges them upon the feed-board F. The feeders F' convey the plants between the squeezing-rollers E E', which latter expel the bulk of the remaining water and moisture. On issuing from these rollers the plants drop upon the secondary elevator G, which in turn delivers them into the feed-hopper $i$ of the drier, whence they descend through the series of drying-rollers I I', by which they are thoroughly dried. From the lowermost pair of drying-rollers the plants are discharged upon the grate $o'$ of the furnace, where they are consumed, as hereinbefore described.

It will thus be observed that the objectionable plants are removed from the stream and destroyed by practically continuous operations, which are all performed on the boat, rendering the apparatus compact and rapid in operation and saving the transferring expense which would be incurred if the removal and destruction of the plants were effected partly on the boat and partly on land. I do not, however, wish to limit my invention to the use of a furnace on the boat, as it may in some cases be desirable to perform only the elevating and drying operations on the boat.

If desired, the dried plants may be utilized as fuel for the boiler-furnace of the boat.

I claim as my invention—

1. An apparatus for removing floating plants from streams, comprising a suitable boat, a plant-pressing device mounted thereon, and a conveyer arranged to elevate the plants from the stream to said pressing device, substantially as set forth.

2. An apparatus for removing floating plants from streams, comprising a suitable boat, a conveyer mounted thereon and arranged to elevate the plants from the stream into the scow, plant-pressing means adapted to receive the plants from said conveyer, and a drier adapted to receive the plants from said pressing means, substantially as set forth.

3. An apparatus for removing floating plants from streams, comprising a suitable boat, a conveyer mounted thereon and arranged to elevate the plants from the stream into the same, plant-pressing means adapted to receive the plants from said conveyer, a drier adapted to receive the plants from said pressing means, and a furnace arranged to receive the plants from the drier, substantially as set forth.

4. An apparatus for removing floating plants from streams, comprising a suitable boat, a conveyer mounted thereon and arranged to elevate the plants into the same, pressure-rollers arranged to receive the elevated plants from said conveyer, and drying-rollers arranged to receive the plants from said pressure-rollers, substantially as set forth.

5. An apparatus for removing floating plants from streams, comprising a suitable boat, an elevator mounted thereon and arranged to dip into the stream, pressure-rollers arranged behind the elevator, a feed device for delivering the plants from the elevator to said pressure-rollers, drying-rollers arranged in rear of the pressure-rollers, and a conveyer arranged between said pressure-rollers and drying-rollers, substantially as set forth.

6. An apparatus for removing floating plants from streams, comprising a suitable boat, a conveyer mounted thereon and arranged to elevate the plants into the same, and a pair of horizontal pressure-rollers which receive the plants from said conveyer, the upper pressure-roller being arranged to overhang the lower one on the receiving side of the rollers, substantially as set forth.

7. An apparatus for removing floating plants from streams, comprising a suitable boat provided in the bottom of its hull with a channel, and a plant-elevator arranged to extend into said channel, substantially as set forth.

8. An apparatus for removing floating plants from streams, comprising a suitable boat provided in the bottom of its hull with a channel, a current-producing device arranged in said channel, and a plant-elevator arranged to extend into said channel in front of said current-producing device, substantially as set forth.

9. An apparatus for removing floating plants from streams, comprising a suitable boat provided in the bottom of its hull with a longitudinal channel, a plant-elevator arranged to extend into said channel, and a current-wheel arranged in said channel in rear of said elevator, substantially as set forth.

10. An apparatus for removing floating plants from streams, comprising a suitable boat provided in its bow with a gathering-throat which narrows toward the stern, and a plant-conveyer mounted on the boat and arranged to extend into the contracted portion of said throat, substantially as set forth.

11. An apparatus for removing floating plants from streams, comprising a suitable boat provided in the bottom of its hull with a longitudinal channel and in its bow with a gathering-throat which leads to said channel, and a plant-elevator extending into said channel, substantially as set forth.

Witness my hand this 25th day of August, 1902.

ARTHUR KING.

Witnesses:
CARL F. GEYER,
THEO. L. POPP.